(12) United States Patent
Negishi et al.

(10) Patent No.: US 10,528,771 B2
(45) Date of Patent: Jan. 7, 2020

(54) CARD READER AND METHOD FOR CONTROLLING CARD READER

(71) Applicant: NIDEC SANKYO CORPORATION, Suwa-gun, Nagano (JP)

(72) Inventors: Akihiro Negishi, Nagano (JP); Tsutomu Orii, Nagano (JP)

(73) Assignee: NIDEC SANKYO CORPORATION, Nagano (JP)

( * ) Notice: Subject to any disclaimer, the term of this patent is extended or adjusted under 35 U.S.C. 154(b) by 12 days.

(21) Appl. No.: 15/563,080

(22) PCT Filed: Mar. 29, 2016

(86) PCT No.: PCT/JP2016/060124
§ 371 (c)(1),
(2) Date: Sep. 29, 2017

(87) PCT Pub. No.: WO2016/158948
PCT Pub. Date: Oct. 6, 2016

(65) Prior Publication Data
US 2019/0332825 A1 Oct. 31, 2019

(30) Foreign Application Priority Data
Mar. 31, 2015 (JP) .................................. 2015-071347

(51) Int. Cl.
*G06K 7/06* (2006.01)
*G06K 7/00* (2006.01)
(52) U.S. Cl.
CPC .................................. *G06K 7/0021* (2013.01)
(58) Field of Classification Search
USPC ........................................................ 235/441
See application file for complete search history.

(56) References Cited

U.S. PATENT DOCUMENTS 6,616,050 B1 * 9/2003 Oki ...................... G06K 7/0021
235/441
7,364,076 B2 * 4/2008 Oguchi .................. G06K 13/08
235/380
(Continued)

FOREIGN PATENT DOCUMENTS

| JP | 2004318229 A | 11/2004 |
| JP | 2008203918 A | 9/2008 |
| JP | 2010026826 A | 2/2010 |

OTHER PUBLICATIONS

International Search Report corresponding to Application No. PCT/JP2016/060124; dated Jun. 21, 2016.

*Primary Examiner* — Tuyen K Vo
(74) *Attorney, Agent, or Firm* — Cantor Colburn LLP

(57) ABSTRACT

A card reader may include a card passage where a card passed; a contact block including IC contact springs; a card insertion detection mechanism; a lock member; a lock member drive mechanism that moves the lock member between a pulling-out prevention position and a pulling-out feasible position; a lock member detection mechanism; and a control unit structured to control the card reader. The lock member may include a pulling-out prevention part. A distance between the front end of the IC card and the pulling-out prevention part may be shorter than a length of the IC card in the moving direction of the IC card. The control unit detects that insertion of the IC card has been completed the IC card has been inserted to the contact position and the lock member is located at the pulling-out prevention position.

6 Claims, 6 Drawing Sheets

(56) References Cited

U.S. PATENT DOCUMENTS

| | | | | |
|---|---|---|---|---|
| 2001/0017318 A1* | 8/2001 | Nagata | ............... | G06K 7/0021 235/451 |
| 2001/0052546 A1* | 12/2001 | Imai | ............... | G06K 7/0004 235/482 |
| 2004/0262389 A1* | 12/2004 | Nagata | ............... | G06K 7/0021 235/441 |
| 2005/0150954 A1* | 7/2005 | Oguchi | ............... | G06K 7/0013 235/439 |
| 2009/0017663 A1* | 1/2009 | Oonishi | ............... | G06K 7/0021 439/325 |
| 2013/0119136 A1* | 5/2013 | Ishikawa | ............... | G07F 19/2055 235/449 |
| 2015/0254534 A1* | 9/2015 | Akahane | ............... | G06K 13/067 235/476 |

* cited by examiner

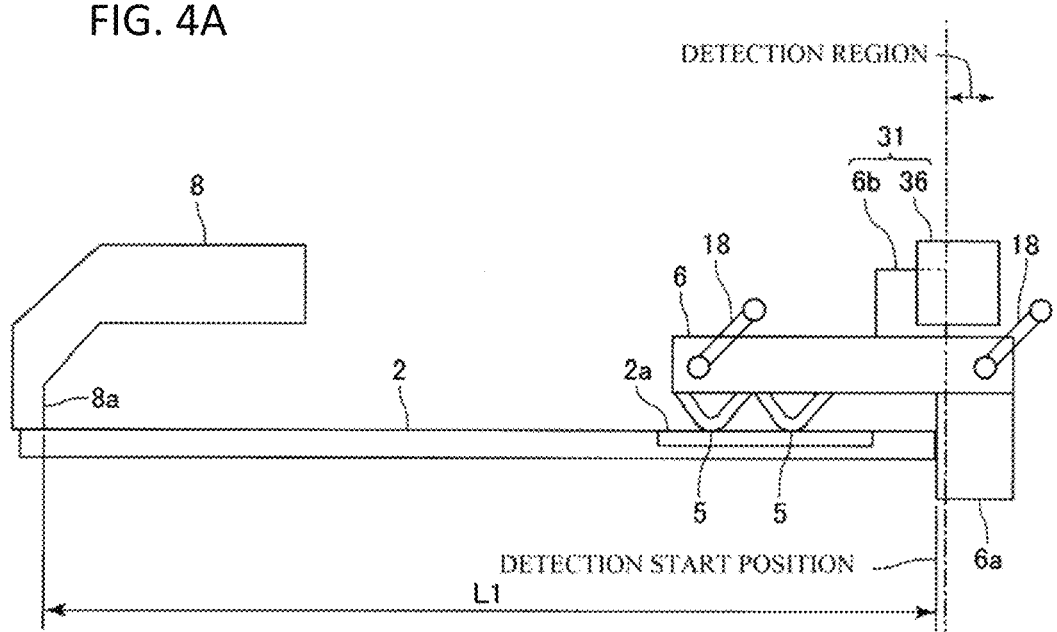
FIG. 4A
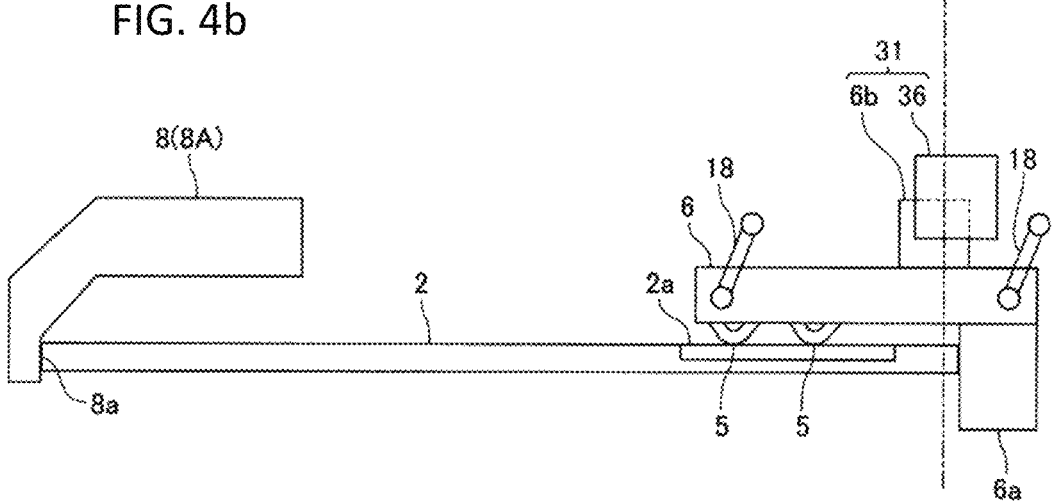
FIG. 4b
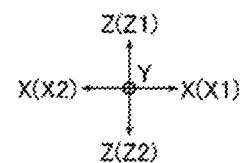

CARD READER AND METHOD FOR CONTROLLING CARD READER

CROSS REFERENCE TO RELATED APPLICATIONS

This is the U.S. national stage of application No. PCT/JP2016/060124, filed on Mar. 29, 2016. Priority under 35 U.S.C. § 119(a) and 35 U.S.C. § 365B is claimed from Japanese Application No. 2015-071347, filed on Mar. 30, 2015; the disclosure of which are incorporated herein by reference.

TECHNICAL FIELD

At least an embodiment of the present invention relates to a manually operated type card reader into and from which a contact type IC card is manually inserted and pulled out.

BACKGROUND

Conventionally, a manually operated type IC card reader has been known, into and from which a contact type IC card is manually inserted and pulled out (see, for example, Patent Literature 1). As shown in FIGS. 8A and 8B, for example, a conventional manually operated type IC card reader includes: a plurality of IC contact springs 103 that are contacted with an external connection terminal 102a of an IC chip formed on an IC card 102 (hereinafter, referred to as a "card 102"); an IC contact block 104 that holds the IC contact springs 103; an arm 105 that movably holds the IC contact block 104; and a tension coil spring (not shown) that urges the IC contact block 104 toward a front side of the IC card reader.

The IC contact block 104 is formed with a card abutting part 104a with which a tip end 102b of the card 102 inserted through a card insertion port is abutted. In the IC card reader, when the tip end 102b of the card 102 inserted through the card insertion port is abutted with the card abutting part 104a and then the card 102 is further inserted, the IC contact block 104 approaches the card 102 while moving toward a rear side of the IC card reader, so that the IC contact springs 103 are contacted with the external connection terminal 102a at a predetermined contact pressure.

The IC card reader also includes: a card insertion detection mechanism 106 that detects that the card 102 has been inserted to a position where the external connection terminal 102a contacts with the IC contact springs 103; and a lock lever 107 that prevents pulling-out of the card 102 inserted to the position where the external connection terminal 102a contacts with the IC contact springs 103. The lock lever 107 is formed with a pulling-out prevention part 107a that is formed in a flat face shape and is contactable with a rear end 102c of the card 102 inserted to the position where the external connection terminal 102a contacts with the IC contact springs 103.

The card insertion detection mechanism 106 is structured of, for example, an optical sensor 108 that includes a light emitting element and a light receiving element disposed oppositely to each other, and a light intercepting part 104b that is formed on the IC contact block 104. When the card 102 is inserted to the position where the external connection terminal 102a contacts with the IC contact springs 103, the light intercepting part 104b intercepts light traveling from the light emitting element to the light receiving element in the sensor 108. Further, the card insertion detection mechanism 106 detects that the card 102 has been inserted to the position where the external connection terminal 102a contacts with the IC contact springs 103, based on the fact that the light intercepting part 104b intercepts the light traveling from the light emitting element to the light receiving element in the sensor 108.

In the IC card reader, when the card insertion detection mechanism 106 detects that the card 102 has been inserted to the position where the external connection terminal 102a contacts with the IC contact springs 103, the lock lever 107 locks the card 102. Further, when the card insertion detection mechanism 106 detects that the card 102 has been inserted to the position where the external connection terminal 102a contacts with the IC contact springs 103, the card 102 is activated in order to perform data communication between the IC card reader and the card 102.

Patent Literature 1: Japanese Patent Laid-Open No. 2008-203918

Typically, the sensor 108 has a detection region in a predetermined range. Therefore, in a case that the light intercepting part 104b of the IC contact block 104 is located inside the detection region of the sensor 108, the card insertion detection mechanism 106 detects that the card 102 has been inserted to the position where the external connection terminal 102a contacts with the IC contact springs 103. In order that the lock lever 107 surely locks the inserted card 102 after the card insertion detection mechanism 106 has detected that the card 102 has been inserted, as shown in FIG. 8A, a distance L101 between the tip end 102b of the card 102 at the time when the tip end 102b of the card 102 has been inserted to a detection start position of the card insertion detection mechanism 106 (in other words, at the time when the card insertion detection mechanism 106 starts to detect that the card 102 has been inserted to the position where the external connection terminal 102a contacts with the IC contact springs 103 (more specifically, at the time when the light intercepting part 104b starts to enter the detection region of the sensor 108)) and the pulling-out prevention part 107a of the lock lever 107 at the time when the lock lever 107 locks the card 102 is required to be longer than a length of the card 102.

According to this structure, however, in a case that data communication is performed between the IC card reader and the card 102 in the state in which the card 102 is locked by the lock lever 107, the rear end 102c of the card 102 may move to a position where the rear end 102c of the card 102 contacts with the pulling-out prevention part 107a for any reason as shown in FIG. 8B, for example. Ideally, the distance L101 and the length of the card 2 are set to be equal to each other. However, it is difficult to severely control the distance L101 and the length of the card 102 so that they become equal to each other, due to influences of tolerances of the sensor 108, installation errors, and the like.

Further, in the case that data communication is performed between the IC card reader and the card 102 in the state in which the card 102 is locked by the lock lever 107, for example, if the rear end 102c of the card 102 moves to the position where the rear end 102c of the card 102 contacts with the pulling-out prevention part 107a, as shown in FIG. 8B, the light intercepting part 104b deviates from the detection region of the sensor 108. As a result, the card insertion detection mechanism 106 may fail to detect that the card 102 has been inserted to the position where the external connection terminal 102a contacts with the IC contact springs 103. Further, the external connection terminal 102a may be separated from the IC contact springs 103. Therefore, if the distance L101 is longer than the length of the card

102, data communication between the IC card reader and the card 102 becomes unstable, which may result in occurrence of communication error.

In view of the problem described above, at least an embodiment of the present invention provides a manually operated type card reader capable of preventing forcible pulling-out of an IC card during data communication between the card reader and the IC card and capable of preventing occurrence of communication error in a state in which a lock member locks the IC card. Further, at least an embodiment of the present invention provides a method for controlling the card reader.

To achieve the above, at least an embodiment of the present invention provides a manually operated type card reader into and from which a contact type IC card is manually inserted and pulled out, the card reader including: a card passage where the IC card is passed; an IC contact block that includes a plurality of IC contact springs structured to contact with an external connection terminal of an IC chip formed on the IC card; a card insertion detection mechanism that detects that the IC card has been inserted to a contact position where the external connection terminal is contactable with the IC contact springs; a lock member that moves between a pulling-out prevention position where the IC card inserted to the contact position is prevented from being pulled out and a pulling-out feasible position where insertion and pulling-out of the IC card become feasible; a lock member drive mechanism that moves the lock member between the pulling-out prevention position and the pulling-out feasible position; a lock member detection mechanism that detects that the lock member is located at the pulling-out prevention position; and a control unit that controls the card reader. An inserting direction-side end of the IC card is referred to as a front end, and a pulling-out direction-side end of the IC card is referred to as a rear end. The lock member is formed with a pulling-out prevention part with which the rear end of the IC card is contactable when the lock member is located at the pulling-out prevention position. A distance in a moving direction of the IC card between the front end of the IC card at the time when the card insertion detection mechanism starts to detect that the IC card has been inserted to the contact position and the pulling-out prevention part at the time when the lock member is located at the pulling-out prevention position is shorter than a length of the IC card in the moving direction of the IC card. The control unit detects that insertion of the IC card has been completed when the card insertion detection mechanism detects that the IC card has been inserted to the contact position and the lock member detection mechanism detects that the lock member is located at the pulling-out prevention position.

According to at least an embodiment of the present invention, for example, when the control unit detects that the insertion of the IC card has been completed, then, the control unit transmits an insertion completion detection signal to a host control unit that is a control unit of a host apparatus on which the card reader is mounted, and activates the IC card, based on an activation command that is transmitted from the host control unit in order to activate the IC card.

In the card reader according to at least an embodiment of the present invention, the distance in the moving direction of the IC card between the front end of the IC card at the time when the card insertion detection mechanism starts to detect that the IC card has been inserted to the contact position and the pulling-out prevention part at the time when the lock member is located at the pulling-out prevention position is shorter than the length of the IC card in the moving direction of the IC card. According to at least an embodiment of the present invention, further, the control unit detects that insertion of the IC card has been completed when the card insertion detection mechanism detects that the IC card has been inserted to the contact position and the lock member detection mechanism detects that the lock member is located at the pulling-out prevention position. According to at least an embodiment of the present invention, therefore, data communication between the card reader and the IC card is performed in such a manner that, for example, when the control unit detects that the insertion of the IC card has been completed, then, the control unit transmits the insertion completion detection signal to the host control unit and activates the IC card based on the activation command transmitted from the host control unit. The data communication between the card reader and the IC card can thus be performed in the state in which the lock member prevents pulling-out of the IC card. According to at least an embodiment of the present invention, accordingly, it is possible to prevent forcible pulling-out of the IC card during data communication between the card reader and the IC card and to prevent occurrence of communication error in the state in which the lock member locks the IC card.

According to at least an embodiment of the present invention, the card reader includes, for example, an insertion start detection mechanism that detects that the IC card has been inserted into an insertion port for the IC card. In this case, for example, the control unit transmits an insertion completion undetection signal to the host control unit when the card insertion detection mechanism does not detect that the IC card has been inserted to the contact position or when the lock member detection mechanism does not detect that the lock member is located at the pulling-out prevention position, within a predetermined period of time after the insertion start detection mechanism has detected that the IC card has been inserted into the insertion port.

According to at least an embodiment of the present invention, when the card insertion detection mechanism detects that the IC card has been inserted to the contact position, the control unit causes the lock member drive mechanism to move the lock member located at the pulling-out feasible position, toward the pulling-out prevention position, and continues to actuate the lock member drive mechanism for a predetermined period of time until the lock member detection mechanism detects that the lock member is located at the pulling-out prevention position, after the card insertion detection mechanism has detected that the IC card has been inserted to the contact position. According to this structure, even when the IC card is inserted to the contact position, but is not inserted to a position where the lock member becomes movable to the pulling-out prevention position, the card reader is not turned into an error state for at least a predetermined period of time. Accordingly, a user can have a grace period for inserting the IC card to the position where the lock member becomes movable to the pulling-out prevention position. Further, the user can insert the IC card to the position where the lock member becomes movable to the pulling-out prevention position, within the grace period. As a result, the control unit can detect that the insertion of the IC card has been completed, on the basis of the fact that the lock member detection mechanism has detected that the lock member is located at the pulling-out prevention position.

According to at least an embodiment of the present invention, the card reader may be controlled by, for example, a method including: a card insertion wait command receiving step of receiving a card insertion wait command from a host control unit that is a control unit of a host apparatus on which the card reader is mounted; an insertion start determining step of, after reception of the card insertion wait command from the host control unit, determining within a predetermined first period of time whether the insertion start detection mechanism has detected that IC card has been inserted into the insertion port; a card insertion determining step of, when it is determined in the insertion start determining step that the IC card has been inserted into the insertion port, determining within a predetermined second period of time whether the card insertion detection mechanism has detected that the IC card has been inserted to the contact position; and a lock member position determining step of, when it is determined in the card insertion determining step that the IC card has been inserted to the contact position, determining within a predetermined third period of time whether the lock member detection mechanism has detected that the lock member is located at the pulling-out prevention position. In the method for controlling the card reader, for example, when it is determined in the insertion start determining step that the IC card is not inserted into the insertion port, an insertion start undetection signal is transmitted to the host control unit, and the card insertion wait command receiving step is carried out again, and when it is determined in the card insertion determining step that the IC card is not inserted to the contact position or it is determined in the lock member position determining step that the lock member is not located at the pulling-out prevention position, an insertion completion undetection signal is transmitted to the host control unit, and the card insertion wait command receiving step is carried out again.

As described above, in at least an embodiment of the present invention, it is possible to prevent forcible pulling-out of an IC card during data communication between a card reader and the IC card and to prevent occurrence of communication error in a state in which a lock member locks the IC card.

BRIEF DESCRIPTION OF DRAWINGS

Embodiments will now be described, by way of example only, with reference to the accompanying drawings which are meant to be exemplary, not limiting, and wherein like elements are numbered alike in several Figures, in which:

FIGS. 4A and 4B are schematic side views of an IC contact block, a lock lever, and the like each shown in FIG. 1.

DETAILED DESCRIPTION

Embodiments of the present invention will be described below with reference to the accompanying drawings.

(Structure of Card Reader)

Figure 1:
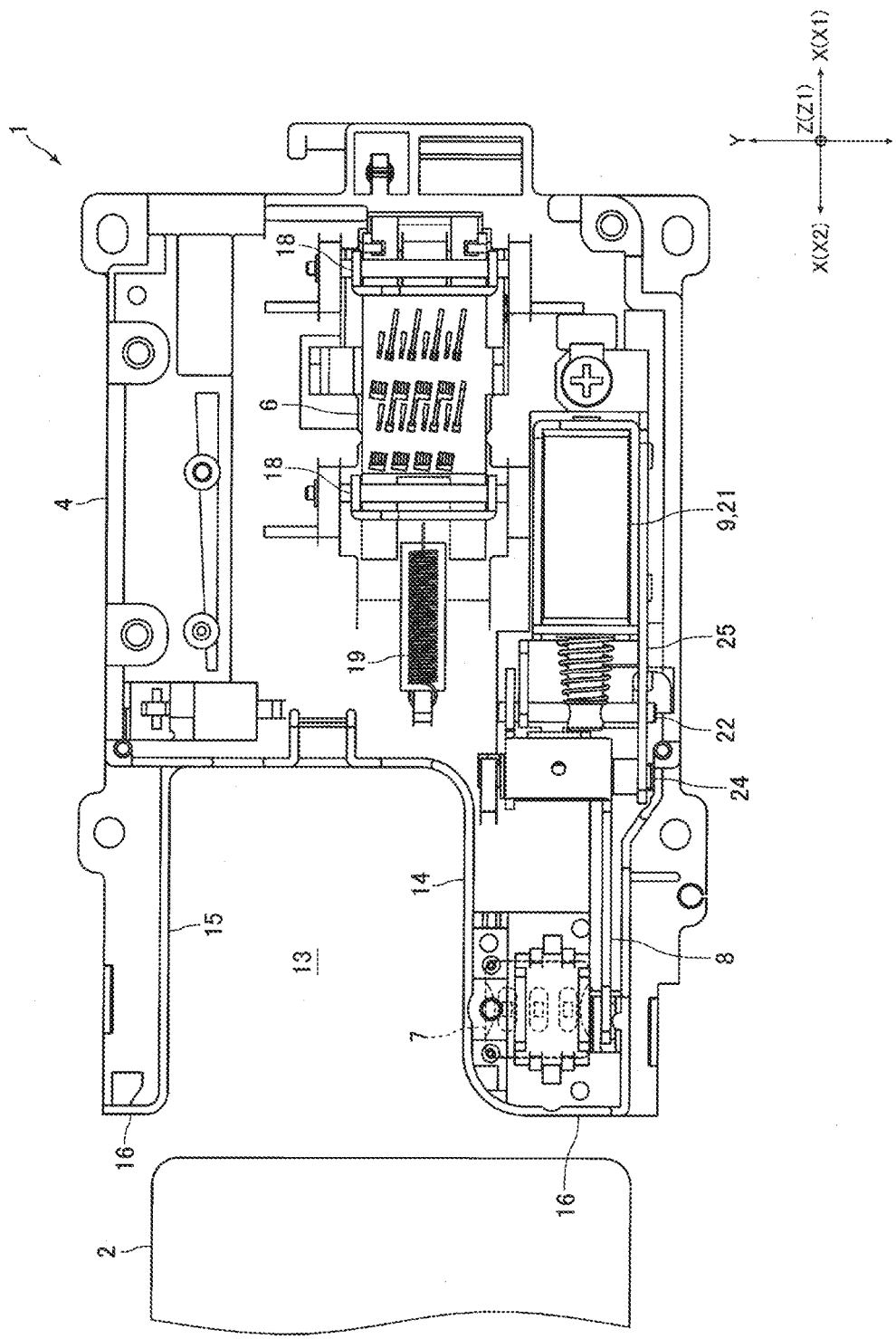
FIG. 1 is an explanatory plan view showing a structure of a card reader in accordance with an embodiment of the present invention.
Figure 2:
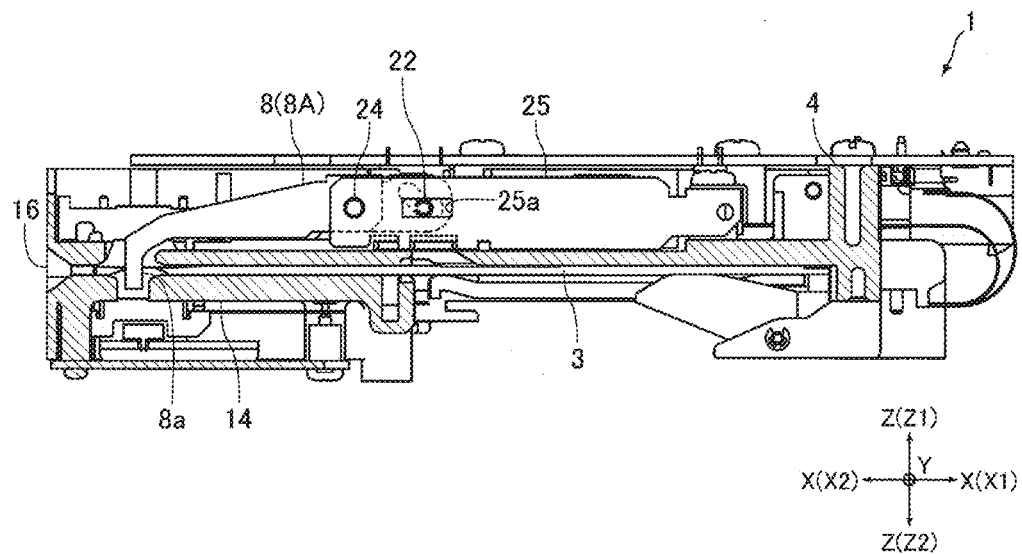
FIG. 2 is an explanatory longitudinal sectional view showing the structure of the card reader shown in FIG. 1.
Figure 3:
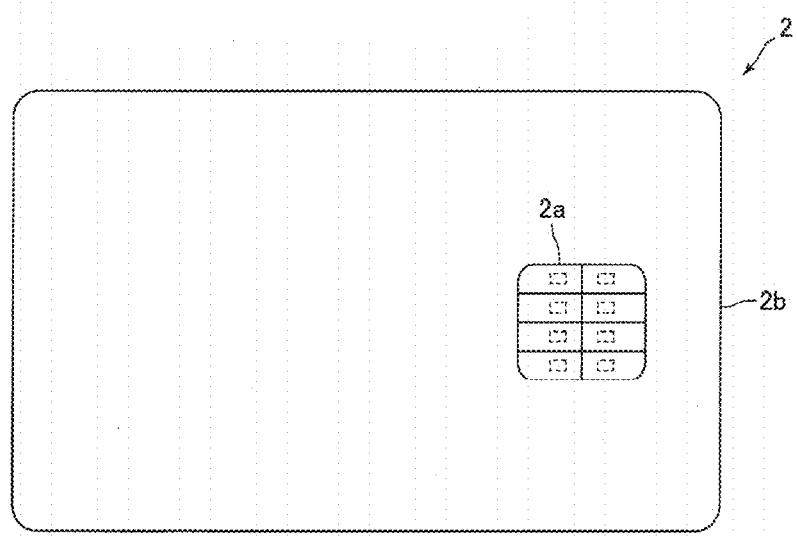
FIG. 3 is a plan view of a card shown in FIG. 1.
Figure 5:
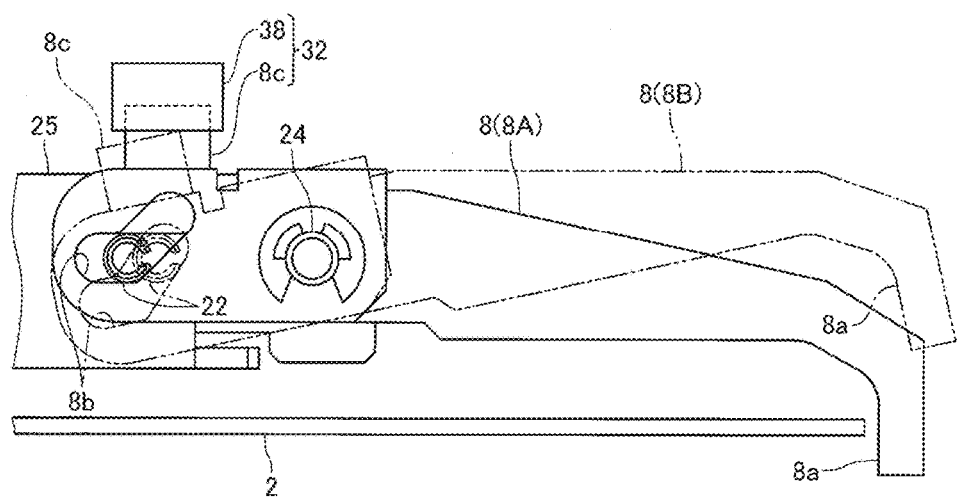
FIG. 5 is a view showing the lock lever, a shaft support member, and the like each shown in FIG. 2 and viewed from another direction.
Figure 6:
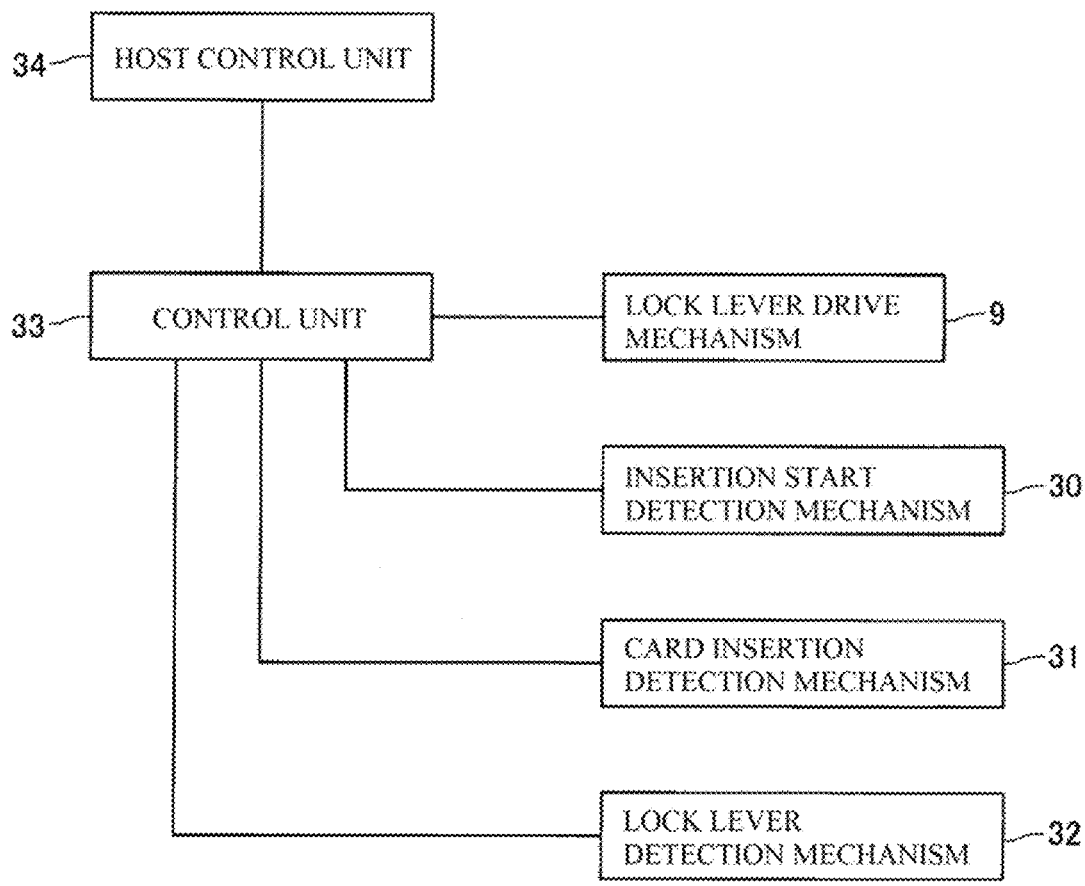
FIG. 6 is a block diagram of a structure concerning control of the card reader shown in FIG. 1, in inserting a card into the card reader.

FIG. 1 is an explanatory plan view showing a structure of a card reader 1 in accordance with an embodiment of the present invention. FIG. 2 is an explanatory longitudinal sectional view showing the structure of the card reader 1 shown in FIG. 1. FIG. 3 is a plan view of a card 2 shown in FIG. 1. FIGS. 4A and 4B are schematic side views of an IC contact block 6, a lock lever 8, and the like each shown in FIG. 1. FIG. 5 is a view showing the lock lever 8, a shaft support member 25, and the like each shown in FIG. 2 and viewed from another direction. FIG. 6 is a block diagram of a structure concerning control of the card reader 1 shown in FIG. 1, in inserting a card into the card reader 1.

The card reader 1 in this embodiment is a manually operated type card reader. A contact type IC card 2 (hereinafter, referred to as a "card 2") is manually inserted into and pulled out from the card reader 1. Specifically, the card reader 1 is a so-called dip-type card reader in which insertion of the card 2 into the card reader 1 and pulling-out of the card 2 from the card reader 1 are manually performed to read and record data by a user. The card reader 1 is mounted for use on a predetermined host apparatus (not shown).

As shown in FIG. 2, the card reader 1 is formed with a card passage 3 where the card 2 is passed. The card reader 1 includes a frame 4 inside which the card passage 3 is formed, an IC contact block 6 that includes a plurality of IC contact springs 5, and a magnetic head 7. The card reader 1 also includes a lock lever 8 serving as a lock member that prevents pulling-out of the card 2 inserted into the card reader 1, and a lock lever drive mechanism 9 serving as a lock member drive mechanism that moves the lock lever 8.

In this embodiment, the card 2 is moved in an "X" direction shown in FIG. 1 and the like. Specifically, the card 2 is inserted in an "X1" direction and is pulled out in an "X2" direction. In other words, the "X" direction is a moving direction of the card 2, the "X1" direction is an inserting direction of the card 2 into the card reader 1, and the "X2" direction is a pulling-out direction of the card 2 from the card reader 1. Further, a "Z" direction in FIG. 1 and the like perpendicular to the "X" direction is a thickness direction of the card 2 moved along the card passage 3, and a "Y" direction in FIG. 1 and the like perpendicular to the "X" direction and the "Z" direction is a width direction of the card 2 moved along the card passage 3. In the following descriptions, the "X" direction is referred to as a "front and rear direction", the "Y" direction is referred to as a "right and left direction", and the "Z" direction is referred to as an "upper and lower direction". Further, an "X1" direction side is referred to as a "rear" side, an "X2" direction side is referred to as a "front" side, a "Z1" direction side is referred to as an "upper" side, and a "Z2" direction side is referred to as a "lower" side.

The card 2 is a substantially rectangular-shaped card made of vinyl chloride whose thickness is about 0.7-0.8 mm. The card 2 is in conformity with the international standard or JIS standard. A rear face of the card 2 is formed with a magnetic stripe in which magnetic data are recorded. Further, the card 2 is incorporated with an IC chip and, as shown in FIG. 3, a front face of the card 2 is formed with an external connection terminal 2a of the IC chip. The external connection terminal 2a is formed at a predetermined position with one end 2b in a longitudinal direction of the card 2 as a reference. The card 2 is inserted into the card reader 1 from one end 2b side in a state in which the front face of the card 2 is directed to the upper side and the longitudinal direction of the card 2 is substantially coincided with the front and rear direction.

As shown in FIG. 1, a portion on a front end side of the card reader 1 is formed as a cut-out part 13 that is cut out so that the card 2 can be inserted and pulled out by the user. Specifically, the cut-out part 13 whose shape when viewed in the upper and lower direction is a substantially "U" shape is formed so as to be cut from a front end of the frame 4 toward the rear side. Further, the cut-out part 13 is formed at a middle position of the frame 4 in the right and left direction, and protruded parts 14 and 15 are formed on both sides in the right and left direction of the cut-out part 13.

The card passage 3 is, as shown in FIG. 2, formed in a straight shape when viewed in the right and left direction. A front end of the card passage 3 is formed with an insertion port 16 into which the card 2 is inserted. In other words, the insertion port 16 is formed on front ends of the protruded parts 14 and 15. The magnetic head 7 is disposed on a front end portion of the protruded part 14. Further, the magnetic head 7 is disposed so that a gap of the magnetic head 7 faces the card passage 3 from the lower side.

The IC contact block 6 is disposed on a rear end side portion of the card reader 1. Further, the IC contact block 6 is disposed so that the IC contact springs 5 face the card passage 3 from the upper side, and the IC contact block 6 is disposed on an upper side of the card passage 3. As shown in FIGS. 4A and 4B, a rear end of the IC contact block 6 is formed with a card abutting part 6a with which a tip end of the card 2 (an inserting direction-side end, i.e., a rear end of the card 2) is abutted.

Further, the IC contact block 6 is coupled to an upper end-side portion of the frame 4 via two arms 18 structuring a parallel link mechanism, and is structured to move upward and downward while sliding in the front and rear direction. Specifically, the IC contact block 6 moves to the rear side to move downward, and moves to the front side to move upward. Further, the IC contact block 6 is urged toward the front side by a tension coil spring 19. A part of the IC contact block 6 may be engaged with a guide groove formed in the frame 4, and the IC contact block 6 may be guided by the guide groove to move upward and downward while sliding in the front and rear direction.

In this embodiment, when the tip end of the card 2 inserted to the rear side of the card reader 1 is engaged with the card abutting part 6a of the IC contact block 6 and, then, the card 2 is further inserted toward the rear side, the IC contact block 6 moves downward while sliding toward the rear side, so that the IC contact springs 5 are contacted with the external connection terminal 2a on the card 2. Further, when the card 2 inserted into the card reader 1 is pulled out toward the front side, the IC contact block 6 moves upward while sliding toward the front side by an urging force of the tension coil spring 19 so that the IC contact springs 5 are separated from the front face of the card 2.

The lock lever 8 is movable between a pulling-out prevention position (in other words, a position where the card passage 3 is closed, a position shown in FIG. 2, and a position shown by a solid line in FIG. 5) 8A where the card 2, which is inserted toward the rear side to a contact position where the external connection terminal 2a contacts with the IC contact springs 5, is prevented from being pulled out, and a pulling-out feasible position (in other words, a position where the card passage 3 is open, and a position shown by a two-dot chain line in FIG. 5) 8B where insertion and pulling-out of the card 2 become feasible. In this embodiment, the lock lever 8 is turnable between the pulling-out prevention position 8A and the pulling-out feasible position 8B.

The lock lever drive mechanism 9 turns the lock lever 8 between the pulling-out prevention position 8A and the pulling-out feasible position 8B. The lock lever drive mechanism 9 includes a solenoid 21 and a fixed pin 22 that is fixed to a plunger of the solenoid 21. The fixed pin 22 is disposed so that its axial direction and the right and left direction are coincided with each other.

The lock lever 8 is turnably held by a turning center shaft 24 that is disposed with the right and left direction as its axial direction, and is turnable about the turning center shaft 24 with the right and left direction as an axial direction of turning. The turning center shaft 24 is fixed to a shaft support member 25 that is fixed to the frame 4. The shaft support member 25 is formed with guide grooves 25a through which right and left end-side portions of the fixed pin 22 are inserted. The guide groove 25a is formed in an elongated circular shape whose longitudinal direction is the front and rear direction. The lock lever 8 is formed with a pulling-out prevention part 8a with which the rear end of the card 2 (a pulling-out direction-side end, i.e., a front end of the card 2) is contactable when the lock lever 8 is located at the pulling-out prevention position 8A. The pulling-out prevention part 8a is formed in a flat face shape that is perpendicular to the front and rear direction when the lock lever 8 is located at the pulling-out prevention position 8A. Further, the lock lever 8 is formed with a cam groove 8b through which a one end-side portion in the right and left direction of the fixed pin 22 is inserted.

The solenoid 21 is fixed to the frame 4 so that the plunger of the solenoid 21 is protruded toward the front side. As described above, the right and left end-side portions of the fixed pin 22 are inserted through the guide grooves 25a of the shaft support member 25, so that the plunger moves in the front and rear direction. Further, the one end-side portion in the right and left direction of the fixed pin 22 is inserted through the cam groove 8b formed in the lock lever 8. When the plunger moves in the front and rear direction, the lock lever 8 turns between the pulling-out prevention position 8A and the pulling-out feasible position 8B about the turning center shaft 24. In this embodiment, the pulling-out prevention part 8a moves toward the lower side when the lock lever 8 turns from the pulling-out feasible position 8B to the pulling-out prevention position 8A, and moves toward the upper side when the lock lever 8 turns from the pulling-out prevention position 8A to the pulling-out feasible position 8B.

The card reader 1 also includes an insertion start detection mechanism 30 that detects that the card 2 has been inserted into the insertion port 16, a card insertion detection mechanism 31 that detects that the card 2 has been inserted to the contact position where the external connection terminal 2a of the card 2 is contactable with the IC contact springs 5, and a lock lever detection mechanism 32 serving as a lock member detection mechanism that detects that the lock lever 8 is located at the pulling-out prevention position 8A (see FIG. 6). It should be noted that the insertion start detection mechanism 30, the card insertion detection mechanism 31, and the lock lever detection mechanism 32 are not shown in FIGS. 1 and 2.

The insertion start detection mechanism 30, the card insertion detection mechanism 31, and the lock lever detection mechanism 32 are connected to a control unit 33 that controls the card reader 1. The lock lever drive mechanism 9 is also connected to the control unit 33. Specifically, the solenoid 21 structuring the lock lever drive mechanism 9 is connected to the control unit 33. Further, the control unit 33 is connected to a host control unit 34 that is a control unit of a host apparatus on which the card reader 1 is mounted.

The insertion start detection mechanism 30 is, for example, a transmission type optical sensor including a light emitting element and a light receiving element, and is disposed on a front end-side portion of the protruded part 14. In the insertion start detection mechanism 30, the light emitting element and the light receiving element are disposed to be opposite to each other with the card passage 3 sandwiched therebetween in the upper and lower direction, for example. The insertion start detection mechanism 30 may be structured of, for example, a transmission type optical sensor that includes a light emitting element and a light receiving element, and a lever member that includes a light intercepting part that intercepts between the light emitting element and the light receiving element in the sensor. In this case, the lever member is located at a position where the card 2 inserted into the insertion port 16 contacts. When the card 2 contacts with the lever member, the light intercepting part of the lever member intercepts between the light emitting element and the light receiving element in the sensor. The insertion start detection mechanism 30 may also be structured of, for example, a contact switch and a lever member that is contactable with the contact switch when the card 2 contacts therewith.

As shown in FIG. 4, the card insertion detection mechanism 31 is structured of, for example, a transmission type optical sensor 36 that includes a light emitting element and a light receiving element, and a light intercepting part 6*b* that is formed on the IC contact block 6. In the sensor 36, the light emitting element and the light receiving element are disposed to be opposite to each other with a predetermined clearance. The light intercepting part 6*b* is formed at a position where the light intercepting part 6*b* intercepts between the light emitting element and the light receiving element in the sensor 36 when the card 2 has been inserted to the contact position where the external connection terminal 2*a* on the card 2 is contactable with the IC contact springs 5. The card insertion detection mechanism 31 detects that the card 2 has been inserted to the contact position where the external connection terminal 2*a* is contactable with the IC contact springs 5, based on the fact that the light intercepting part 6*b* intercepts light traveling from the light emitting element to the light receiving element in the sensor 36. As described above, the card insertion detection mechanism 31 is connected to the control unit 33. Specifically, the sensor 36 is connected to the control unit 33.

The card insertion detection mechanism 31 may be structured of, for example, a lever member that is provided independently of the IC contact block 6, and a transmission type optical sensor. In this case, the lever member is disposed at a position where a tip end side of the card 2 contacts with the lever member. When the card 2 is inserted to the contact position where the external connection terminal 2*a* is contactable with the IC contact springs 5, a light intercepting part of the lever member intercepts between a light emitting element and a light receiving element in the sensor. The card insertion detection mechanism 31 may also be structured of, for example, a contact switch and a lever member that is contactable with the contact switch. In this case, when the card 2 is inserted to the contact position where the external connection terminal 2*a* is contactable with the IC contact springs 5, the lever member is contacted with the contact switch. In this case, the lever member may be formed on the IC contact block 6 or may be provided independently of the IC contact block 6.

As shown in FIG. 5, the lock lever detection mechanism 32 is structured of, for example, a transmission type optical sensor 38 that includes a light emitting element and a light receiving element, and a light intercepting part 8*c* that is formed on the lock lever 8. In the sensor 38, the light emitting element and the light receiving element are disposed to be opposite to each other with a predetermined clearance. The light intercepting part 8*c* is formed at a position where the light intercepting part 8*c* intercepts between the light emitting element and the light receiving element in the sensor 38 when the lock lever 8 is located at the pulling-out prevention position 8A. The lock lever detection mechanism 32 detects that the lock lever 8 is located at the pulling-out prevention position 8A, based on the fact that the light intercepting part 8*c* intercepts light traveling from the light emitting element to the light receiving element in the sensor 38. As described above, the lock lever detection mechanism 32 is connected to the control unit 33. Specifically, the sensor 38 is connected to the control unit 33.

Further, the lock lever detection mechanism 32 may also be structured of, for example, a contact switch and a lever member that is contactable with the contact switch. In this case, for example, when the lock lever 8 is located at the pulling-out prevention position 8A, the lever member is contacted with the contact switch, so that the lock lever detection mechanism 32 detects that the lock lever 8 is located at the pulling-out prevention position 8A. Also in this case, the lever member is formed on the lock lever 8.

The sensor 36 has a detection region in a certain range. In a case that the light intercepting part 6*b* of the IC contact block 6 is located inside the detection region of the sensor 36, the card insertion detection mechanism 31 detects that the card 2 has been inserted to the contact position where the external connection terminal 2*a* contacts with the IC contact springs 5. In this embodiment, as shown in FIG. 4A, a distance L1 in the front and rear direction between the tip end of the card 2 at the time when the tip end of the card 2 has been inserted to a detection start position of the card insertion detection mechanism 31 (in other words, at the time when the card insertion detection mechanism 31 starts to detect that the card 2 has been inserted to the contact position where the external connection terminal 2*a* contacts with the IC contact springs 5 (specifically, at the time when the light intercepting part 6*b* starts to enter the detection region of the sensor 36)) and the pulling-out prevention part 8*a* at the time when the lock lever 8 is located at the pulling-out prevention position 8A is shorter than a length in the front and rear direction of the card 2 (in other words, a length in the longitudinal direction of the card 2). In other words, as shown in FIG. 4B, the lock lever 8 is disposed so that the tip end of the card 2 is inserted toward the rear side relative to the detection start position of the card insertion detection mechanism 31 in a case that the rear end of the card 2 contacts with the pulling-out prevention part 8*a* at the time when the lock lever 8 is located at the pulling-out prevention position 8A.

(Method for Controlling Card Reader)

Figure 7:
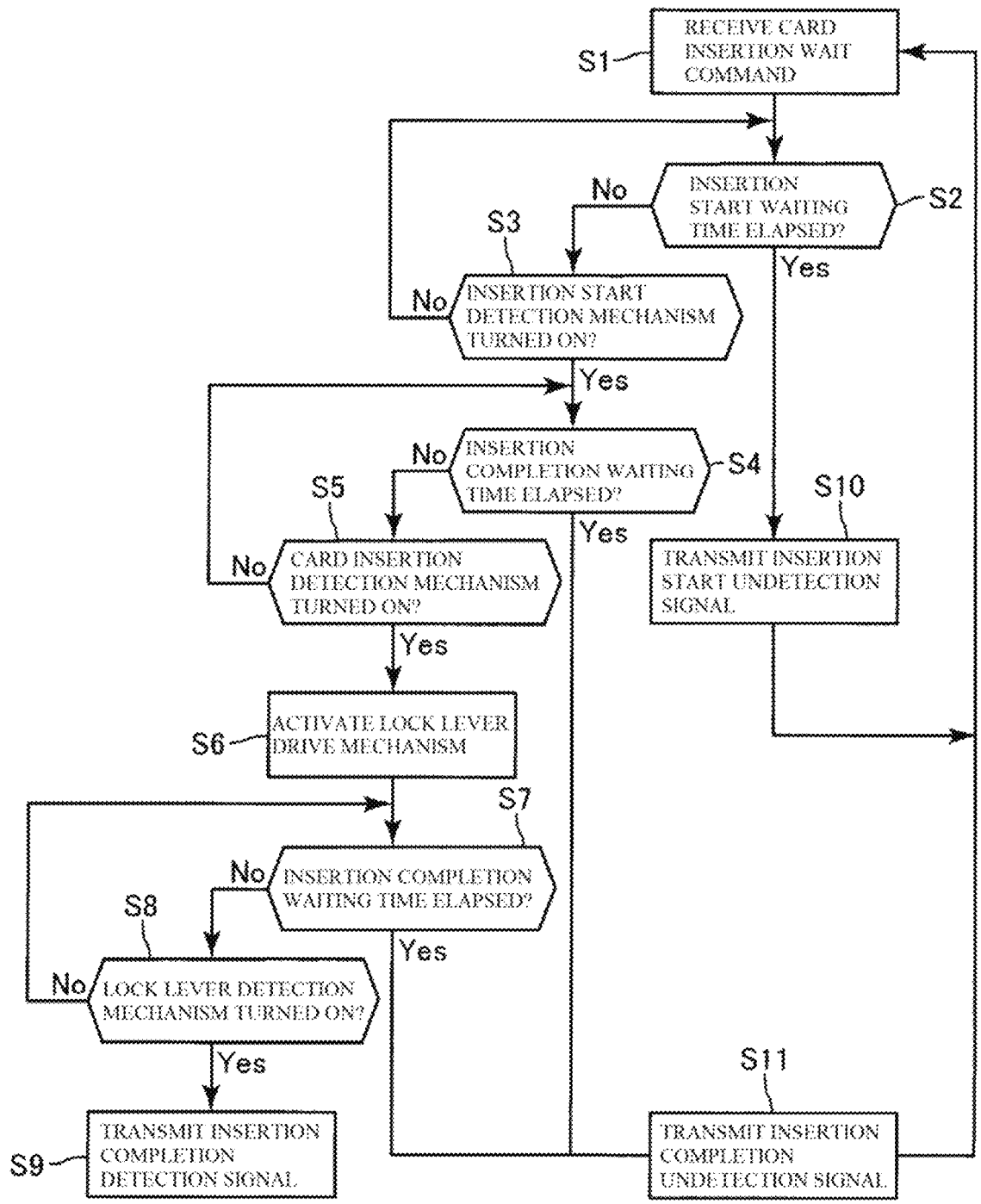
FIG. 7 is a flowchart showing an example of a control flow of the card reader shown in FIG. 1, in inserting a card into the card reader.
Figure 8A:
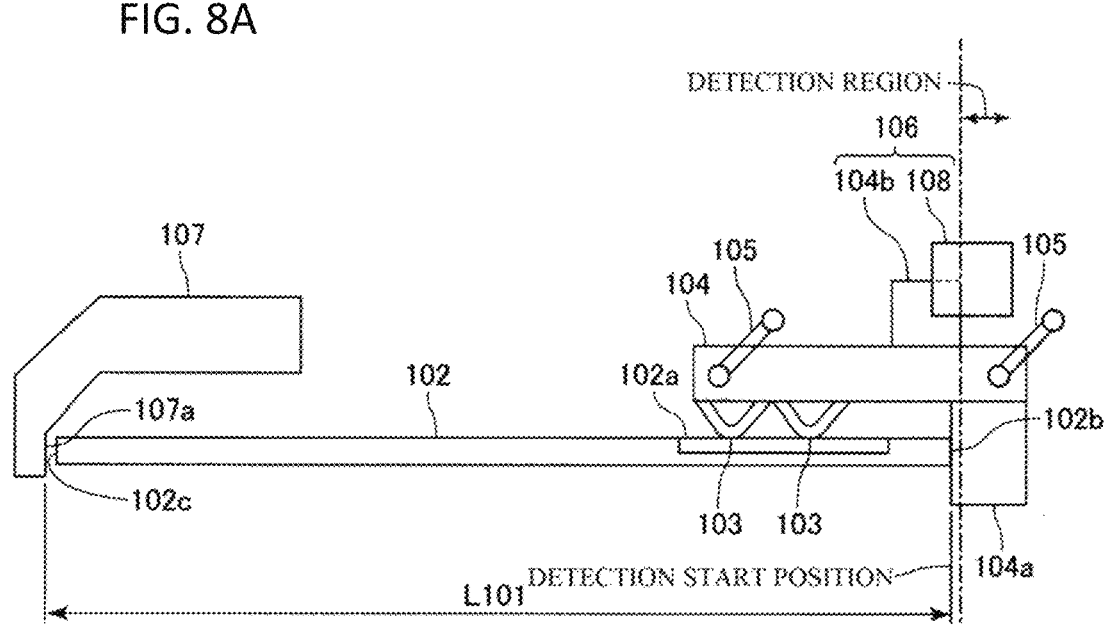
FIGS. 8A and 8B are explanatory views showing a problem in the conventional art.
Figure 8B:
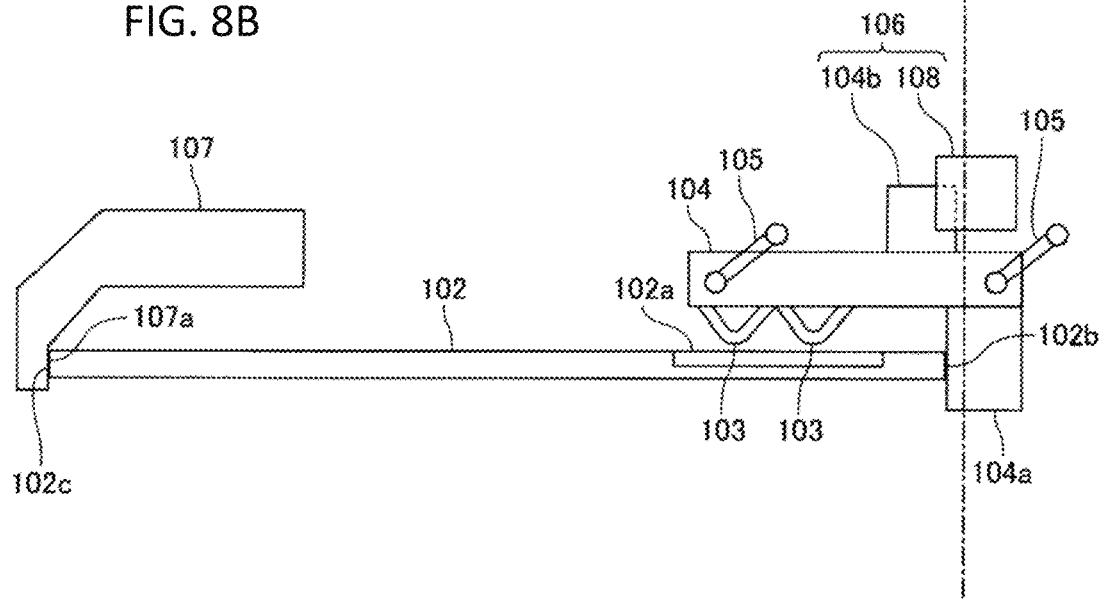

FIG. 7 is a flowchart showing an example of a control flow of the card reader 1 shown in FIG. 1, in inserting a card into the card reader 1.

In a standby state before the card 2 is inserted into the card reader 1, the IC contact block 6 is urged to the front side by the urging force of the tension coil spring 19, and the IC contact springs 5 move upward to a position where the card 2 does not contact therewith. Also in the standby state before the card 2 is inserted into the card reader 1, the lock lever 8 is located at the pulling-out feasible position 8B.

In this state, when the control unit 33 receives a card insertion wait command from the host control unit 34 (Step S1), then, the control unit 33 determines whether the insertion start detection mechanism 30 has detected within a predetermined insertion start waiting time that the card 2 has been inserted into the insertion port 16 (Steps S2 and S3). When the insertion start detection mechanism 30 has detected within the predetermined insertion start waiting time that the card 2 has been inserted into the insertion port 16 in Steps S2 and S3, the control unit 33 determines that the card 2 has been inserted into the insertion port 16. Next, the control unit 33 determines whether the card insertion detection mechanism 31 has detected within a predetermined insertion completion waiting time that the card 2 has been inserted to the contact position where the external connection terminal 2a contacts with the IC contact springs 5 (Steps S4 and S5).

When the card insertion detection mechanism 31 has detected within the predetermined insertion completion waiting time that the card 2 has been inserted to the contact position where the external connection terminal 2a contacts with the IC contact springs 5 in Steps S4 and S5, the control unit 33 determines that the card 2 has been inserted to the contact position. Next, the control unit 33 activates the lock lever drive mechanism 9 (Step S6). Specifically, the control unit 33 feeds current to the solenoid 21 to drive the solenoid 21. In other words, when the card insertion detection mechanism 31 has detected that the IC card 2 has been inserted to the contact position, the control unit 33 causes the lock lever drive mechanism 9 to move the lock lever 8 located at the pulling-out feasible position 8B, toward the pulling-out prevention position 8A.

Next, the control unit 33 determines whether the lock lever detection mechanism 32 has detected within a predetermined insertion completion waiting time that the lock lever 8 is located at the pulling-out prevention position 8A (Steps S7 and S8). In Steps S7 and S8, the control unit 33 continues to actuate the lock lever drive mechanism 9 during a predetermined period of time until the lock lever detection mechanism 32 detects that the lock lever 8 is located at the pulling-out prevention position 8A.

When the lock lever detection mechanism 32 detects in Steps S7 and S8 that the lock lever 8 is located at the pulling-out prevention position 8A, next, the control unit 33 transmits, to the host control unit 34, an insertion completion detection signal indicating that the insertion of the card 2 into the card reader 1 has been completed (Step S9). In other words, when the card insertion detection mechanism 31 detects that the card 2 has been inserted to the contact position and the lock lever detection mechanism 32 detects that the lock lever 8 is located at the pulling-out prevention position 8A, the control unit 33 detects that the insertion of the card 2 has been completed, and transmits the insertion completion detection signal to the host control unit 34. Next, the control unit 33 receives, from the host control unit 34, an activation command for activating the card 2, and activates the card 2 on the basis of the activation command to establish data communication between the card reader 1 and the card 2.

On the other hand, the control unit 33 determines in Steps S2 and S3 that the card 2 is not inserted into the insertion port 16 when the predetermined insertion start waiting time has elapsed without detection by the insertion start detection mechanism 30 that the card 2 has been inserted into the insertion port 16. Next, the control unit 33 transmits, to the host control unit 34, an insertion start undetection signal indicating that the insertion of the card 2 into the card reader 1 does not start yet (Step S10). The control flow then returns to Step S1 in which the control unit 33 receives a card insertion wait command from the host control unit 34 again.

Further, if the control unit 33 determines in Steps S4 and S5 that the card 2 is not inserted to the contact position after a lapse of the predetermined insertion completion waiting time without the detection by the card insertion detection mechanism 31 that the card 2 has been inserted to the contact position where the external connection terminal 2a contacts with the IC contact springs 5 or determines in Steps S7 and S8 that the lock lever 8 is not located at the pulling-out prevention position 8A, then, the control unit 33 transmits an insertion completion undetection signal to the host control unit 34 (Step S11). Next, the control flow returns to Step S1 in which the control unit 33 receives a card insertion wait command from the host control unit 34 again. In other words, if the card insertion detection mechanism 31 does not detect that the card 2 has been inserted to the contact position or the lock lever detection mechanism 32 does not detect that the lock lever 8 is located at the pulling-out prevention position 8A, within a predetermined period of time after the insertion start detection mechanism 30 has detected that the card 2 has been inserted to the insertion port 16, the control unit 33 transmits the insertion completion undetection signal to the host control unit 34. In Step S11, the lock lever 8 is returned to the pulling-out feasible position 8B. Further, the host control unit 34, which has received the insertion completion undetection signal, executes predetermined error handling before transmitting a card insertion wait command to the control unit 33.

In this embodiment, Step S1 is a card insertion wait command receiving step of receiving a card insertion wait command from the host control unit 34. Further, Steps S2 and S3 are an insertion start determining step of, after reception of the card insertion wait command from the host control unit 34, determining within a predetermined first period of time whether the insertion start detection mechanism 30 has detected that the card 2 has been inserted into the insertion port 16. Also in this embodiment, Steps S4 and S5 are a card insertion determining step of, when it is determined in the insertion start determining step that the card 2 has been inserted into the insertion port 16, determining within a predetermined second period of time whether the card insertion detection mechanism 31 has detected that the card 2 has been inserted to the contact position. Further, Steps S7 and S8 are a lock member position determining step of, when it is determined in the card insertion determining step that the card 2 has been inserted to the contact position, determining within a predetermined third period of time that whether the lock lever detection mechanism 32 has detected the lock lever 8 is located at the pulling-out prevention position 8A.

(Principal Effects in this Embodiment)

As described above, in this embodiment, when the card insertion detection mechanism 31 detects that the card 2 has been inserted to the contact position and the lock lever detection mechanism 32 detects that the lock lever 8 is located at the pulling-out prevention position 8A, the control unit 33 detects that the insertion of the card 2 has been completed, and transmits an insertion completion detection signal to the host control unit 34. Also in this embodiment, the control unit 33 receives, from the host control unit 34, an activation command for activating the card 2, and activates the card 2 on the basis of the activation command to establish data communication between the card reader 1 and the card 2. In this embodiment, in other words, data communication is performed between the card reader 1 and the card 2 in the state in which the lock lever 8 prevents the pulling-out of the card 2. In this embodiment, therefore, the card 2 can be prevented from being forcibly pulled out in performing data communication between the card reader 1 and the card 2 even when the distance L1 in the front and rear direction between the tip end of the card 2 at the time when the card insertion detection mechanism 31 starts to detect that the card 2 has been inserted to the contact position where the external connection terminal 2a contacts with the IC contact springs 5 and the pulling-out prevention part 8a at the time when the lock lever 8 is located at the pulling-out prevention position 8A is shorter than the length in the front and rear direction of the card 2.

In this embodiment, in Steps S7 and S8, the control unit 33 continues to actuate the lock lever drive mechanism 9 during the predetermined period of time until the lock lever detection mechanism 32 detects that the lock lever 8 is located at the pulling-out prevention position 8A. In this embodiment, therefore, even when the card 2 is inserted to the contact position, but is not inserted to the position where the lock lever 8 becomes movable to the pulling-out prevention position 8A, the card reader 1 is not turned into an error state for at least a predetermined period of time. In this embodiment, accordingly, a user can have a grace period for inserting the card 2 to the position where the lock lever 8 becomes movable to the pulling-out prevention position 8A. Also in this embodiment, the user can insert the card 2 to the position where the lock lever 8 becomes movable to the pulling-out prevention position 8A, within the grace period. As a result, the control unit 33 can detect that the insertion of the card 2 has been completed, on the basis of the fact that the lock lever detection mechanism 32 has detected that the lock lever 8 is located at the pulling-out prevention position 8A.

Other Embodiments

Described above is an embodiment according to the present invention. However, the present invention is not limited to the above embodiment and various variations and modifications may be made without changing the concept of the present invention.

In the embodiment described above, the lock lever 8 is turnable between the pulling-out prevention position 8A and the pulling-out feasible position 8B. However, the present invention is not limited to this embodiment. For example, a pin-shaped lock lever 8 may be disposed so that an axial direction of the lock lever 8 and the upper and lower direction are coincided with each other and may be movable upward and downward between the pulling-out prevention position 8A and the pulling-out feasible position 8B.

In the embodiment described above, the IC contact block 6 is formed with the card abutting part 6a. The IC contact block 6 is pushed toward the rear side by the card 2 abutting with the card abutting part 6a, and is moved until the IC contact springs 5 are contacted with the external connection terminal 2a on the card 2. However, the present invention is not limited to this embodiment. For example, a moving mechanism may be provided to move the IC contact block 6 until the IC contact springs 5 are contacted with the external connection terminal 2a. In this case, the IC contact block 6 is not formed with the card abutting part 6a. Also in this case, when the card insertion detection mechanism 31 detects that the card 2 has been inserted to the contact position where the external connection terminal 2a is contactable with the IC contact springs 5, the moving mechanism moves the IC contact block 6 until the IC contact springs 5 are contacted with the external connection terminal 2a. In this case, the moving mechanism includes a drive source such as a solenoid.

In the embodiment described above, the card reader 1 includes the magnetic head 7. Alternatively, the card reader 1 does not necessarily include the magnetic head 7. Also in the embodiment described above, the card 2 is a card made of vinyl chloride whose thickness is about 0.7-0.8 mm. Alternatively, the card 2 may be a PET (polyethylene terephthalate) card whose thickness is about 0.18-0.36 mm and may be a paper card having a predetermined thickness.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

The invention claimed is:

1. A card reader for use with a contact type IC card comprising an IC chip having an external connection terminal, the card reader comprising:
a card passage where the IC card is passed;
an IC contact block comprising a plurality of IC contact springs structured to contact with the external connection terminal of the IC card;
a card insertion detection mechanism structured to detect that the IC card has been inserted to a contact position where the external connection terminal is contacted with the IC contact springs;
a lock member structured to move between a pulling-out prevention position and a pulling-out feasible position;
a lock member drive mechanism structured to move the lock member between the pulling-out prevention position and the pulling-out feasible position;
a lock member detection mechanism structured to move that the lock member is located at the pulling-out prevention position; and
a control unit structured to control the card reader,
wherein
an inserting direction-side end of the IC card is referred to as a front end, and a pulling-out direction-side end of the IC card is referred to as a rear end,
the lock member comprises with a pulling-out prevention part with which the rear end of the IC card is contacted when the lock member is located at the pulling-out prevention position,
a distance in a moving direction of the IC card between the front end of the IC card at the time when the card insertion detection mechanism starts to detect that the IC card has been inserted to the contact position and the pulling-out prevention part at the time when the lock member is located at the pulling-out prevention position is shorter than a length of the IC card in the moving direction of the IC card, and
the control unit is structured to detect that insertion of the IC card has been completed when the card insertion detection mechanism detects that the IC card has been inserted to the contact position and the lock member detection mechanism detects that the lock member is located at the pulling-out prevention position.

2. The card reader according to claim 1, wherein the control unit is structured such that, in response to the control unit detecting that the insertion of the IC card has been completed, the control unit transmits an insertion completion detection signal to a host control unit that is a control unit of a host apparatus on which the card reader is mounted, and activates the IC card, based on an activation command that is transmitted from the host control unit in order to activate the IC card.

3. The card reader according to claim 1, further comprising
an insertion start detection mechanism structured to detect that the IC card has been inserted into an insertion port for the IC card.

4. The card reader according to claim 3, wherein the control unit is structured to transmit an insertion completion undetection signal to the host control unit when the card insertion detection mechanism does not detect that the IC card has been inserted to the contact position or when the lock member detection mechanism does not detect that the lock member is located at the pulling-out prevention position, within a predetermined period of time after the insertion start detection mechanism has detected that the IC card has been inserted into the insertion port.

5. The card reader according to claim 1, wherein the control unit is structured such that,
in response to the card insertion detection mechanism detecting that the IC card has been inserted to the contact position, the control unit causes the lock member drive mechanism to move the lock member located at the pulling-out feasible position, toward the pulling-out prevention position, and continues to actuate the lock member drive mechanism for a predetermined period of time until the lock member detection mechanism detects that the lock member is located at the pulling-out prevention position, after the card insertion detection mechanism has detected that the IC card has been inserted to the contact position.

6. A method for controlling the card reader for use with an IC card, the card reader comprising: an insertion start detection mechanism structured to detect that the IC card has been inserted into an insertion port for the IC card; a card insertion detection mechanism structured to detect that the IC card has been inserted to a contact position; and a lock member structured to move between a pulling-out prevention position and a pulling-out feasible position,
the method comprising:
a card insertion wait command receiving step comprising receiving a card insertion wait command from a host control unit that is a control unit of a host apparatus on which the card reader is mounted;
an insertion start determining step comprising, in response to reception of the card insertion wait command from the host control unit, determining within a predetermined first period of time whether the insertion start detection mechanism has detected that the IC card has been inserted into the insertion port;
a card insertion determining step comprising, in response to determining in the insertion start determining step that the IC card has been inserted into the insertion port, determining within a predetermined second period of time whether the card insertion detection mechanism has detected that the IC card has been inserted to the contact position; and
a lock member position determining step of, in response to determining in the card insertion determining step that the IC card has been inserted to the contact position, determining within a predetermined third period of time whether the lock member detection mechanism has detected that the lock member is located at the pulling-out prevention position,
wherein
in response to determining in the insertion start determining step that the IC card is not inserted into the insertion port, an insertion start undetection signal is transmitted to the host control unit, and the card insertion wait command receiving step is carried out again, and
when it is determined in the card insertion determining step that the IC card is not inserted to the contact position or it is determined in the lock member position determining step that the lock member is not located at the pulling-out prevention position, an insertion completion undetection signal is transmitted to the host control unit, and the card insertion wait command receiving step is carried out again.

* * * * *